United States Patent
Bryant et al.

(10) Patent No.: US 7,298,678 B2
(45) Date of Patent: Nov. 20, 2007

(54) ROTATING RECORDER WITH DUAL ENCODER ARRANGEMENT HAVING ECCENTRICITY COMPENSATION

(75) Inventors: Lawrence M. Bryant, Palo Alto, CA (US); Sundeep Chauhan, Edina, MN (US); David Shiao-Min Kuo, Palo Alto, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 595 days.

(21) Appl. No.: 10/921,276

(22) Filed: Aug. 19, 2004

(65) Prior Publication Data

US 2006/0039264 A1    Feb. 23, 2006

(51) Int. Cl.
    *G11B 5/09* (2006.01)
(52) U.S. Cl. .................................. 369/47.38
(58) Field of Classification Search ............... 369/126, 369/101, 47.38, 100, 44.14
    See application file for complete search history.

(56) References Cited

U.S. PATENT DOCUMENTS

| 6,414,916 B1* | 7/2002 | Kojima ................ 369/44.11 |
| 2004/0001415 A1 | 1/2004 | Formato et al. |
| 2004/0021976 A1 | 2/2004 | Deeman et al. |

\* cited by examiner

*Primary Examiner*—Nabil Hindi
(74) *Attorney, Agent, or Firm*—McDermott Will & Emery LLP

(57) ABSTRACT

A rotating recording device, such as an electron beam recorder, is provided with a dual encoder arrangement. A first encoder is employed as a spindle motor controller and located at a first end of a spindle. A second encoder is mounted at a turntable adjacent to a recording surface and used as a position, velocity or clock source for recording the pattern on the substrate. Eccentricity of the mounting of the second encoder is measured against the more accurately mounted spindle control encoder and compensated by a digital clock generating system using a digital phase locked loop.

19 Claims, 3 Drawing Sheets

ROTATING RECORDER WITH DUAL ENCODER ARRANGEMENT HAVING ECCENTRICITY COMPENSATION

FIELD OF THE INVENTION

The present invention relates to the field of recording information with a rotatable recording device, and more particularly, to the control of a rotatable recording device employing a dual encoder arrangement.

BACKGROUND OF THE INVENTION

A magnetic disk drive, such as a hard disk drive, stores data on one or more disks coated with a magnetic medium. For read/write purposes, the surface of the magnetic medium carries a number of generally parallel data tracks, which on a disk type medium, are arranged concentrically with one another about the center of the disk.

An actuator arm positions a transducer or "head" over a desired track, and the head writes data to the track or reads data from the track. As the disk rotates, the actuator arm moves the head in a radial direction across the data tracks under control of a closed-loop servo system, based on position information or "servo data", which is stored within dedicated servo fields of the magnetic medium of the disk. The servo fields can be interleaved with data sectors on the disk surface or can be located on a separate disk surface that is dedicated to storing servo information. As the head passes over the servo fields, it generates a feedback signal that identifies the location of the head relative to the centerline of the desired track. Based on this location, the servo system moves the actuator arm to adjust the head's position so that it moves toward a position over the desired track and/or a desired location within the track of current interest.

One requirement in the manufacture of such a hard disk drive relates to the formation of the servo patterns on the magnetic disk, which are typically in concentric circular patterns. Mastering Systems for forming the servo tracks on a master stamper used in magnetic contact printing have used both stepped translation mechanisms with laser beams and continuous translation mechanisms with electron beams. During the recording of the servo data on the substrate, the substrate is located on a rotating turntable located at the top of a spindle. A spindle control motor rotates the spindle in accordance with control signals provided by a controller. The servo tracks are recorded through exposure to an electron beam or laser beam.

A format signal generator is used to control the electron beam generator or laser beam generator to form the pattern on the disk as it is rotating with the turntable. The control of the format signal generator, and hence the recording on the disk, may be made in accordance with encoder signals from an encoder located at the motor.

Typically, the encoder is provided at a bottom end of a spindle, the end opposite to that of the spindle on which the turntable is mounted. A precise motor control is provided by employing an encoder located in this position. In other words, the encoder at the bottom of the spindle may be mounted such that there is substantially no eccentricity with respect to the axis of rotation of the spindle. This allows for a very precise control of the motor based on the encoder signals.

Although providing for a precisely centered mounting and accurate motor control signals, the location of the encoder at the bottom of the motor is problematic when used to provide a clock, position or velocity source for the format signal generation process during recording. This is due to the mechanical vibrations, however slight, that occur in the rotating portions of the recording system. In particular, the vibrations at the top of the spindle, where the turntable is located, are not synchronized with the vibrations at the bottom of the spindle, where the encoder is located. Because the distances employed in servo tracks are extremely small, such as between 50 to 90 nm, even minute disturbances will create problems of track-to-track phase errors.

Simply moving the encoder adjacent to the recording surface at the top of the spindle does not provide an adequate solution, however. This is because, in practice, providing for a substantially perfectly centrically mounted encoder adjacent to the recording surface has proven to be very difficult to achieve. Hence, an encoder provided adjacent to the recording surface at the turntable exhibits eccentricity during rotation so that the signals are inadequate for providing a precise clock, position or velocity signal employed to control recording.

SUMMARY OF THE INVENTION

There is a need for an arrangement that provides for a precise control of the spindle motor used in rotating the turntable that supports a recording media, but further provides for a precise clock, position or velocity signal that overcomes the disadvantages of single encoder systems.

This and other needs are met by embodiments of the present invention which provide an electron beam recorder comprising a spindle motor and a spindle driven by the spindle motor. The spindle extends to the spindle motor and has first and second ends. A turntable is mounted at the second end of the spindle and has a central axis of rotation. A first encoder is mounted at the first end of the spindle, and a second encoder is mounted on the turntable. A controller is coupled to the first and second encoders and a spindle motor, and controls the spindle motor and generates recording clock signals as a function of encoder signals received from the first and second encoders.

By using dual encoders, the spindle motor may be precisely controlled as a function of encoder signals from the first encoder, and recording clock signals are provided as a function of the encoder signals received from the second encoder. In certain embodiments, the controller includes logic for compensating for the eccentric mounting of the second encoder on the turntable with respect to the central axis of rotation of the turntable.

The earlier stated needs are also met by other embodiments of the present invention which provide a method of controlling a rotating recording device having a spindle, a first encoder mounted on a first end of the spindle, a turntable mounted on a second end of the spindle, a second encoder mounted on the turntable, and a controller coupled to the first and second encoders and controlling the rotating recording device in accordance with signals from the first and second encoders. The method comprises the steps of determining an eccentricity of the second encoder with respect to a central axis of rotation of the spindle, and compensating for the determined eccentricity in the signals from the second encoder.

The earlier stated needs are also met by other embodiments of the present invention which provide an electron beam recorder comprising a turntable and motor arrangement with an encoder mounted at the turntable, and means for compensating signals from the encoder caused by eccentricity in the mounting of the encoder.

The forgoing and other features, aspects and advantages of the present invention will become more apparent from the following detailed description of the present invention when taken in conjunction with the accompanying drawings.

DETAILED DESCRIPTION OF THE INVENTION

The present invention addresses and solves problems related to the precise recording of information, such as servo information, on a recording disk. Problems created by the vibrations in such recording systems are overcome in embodiments of the invention by the provision of a dual encoder system. One of the encoders may be employed to control the spindle motor, while the other encoder may be used to provide clock source signals (or position or velocity) signals used by the signal format generator in the recording device. Eccentricity compensation logic allows the precise clock signal to be generated from the encoder signals provided by an encoder that is mounted on a turntable, despite eccentric mounting of the encoder in this location. Hence, a precise control of the spindle motor and precise generation of a clock signal for recording is achieved, despite presence of vibrations in the system.

Figure 1:
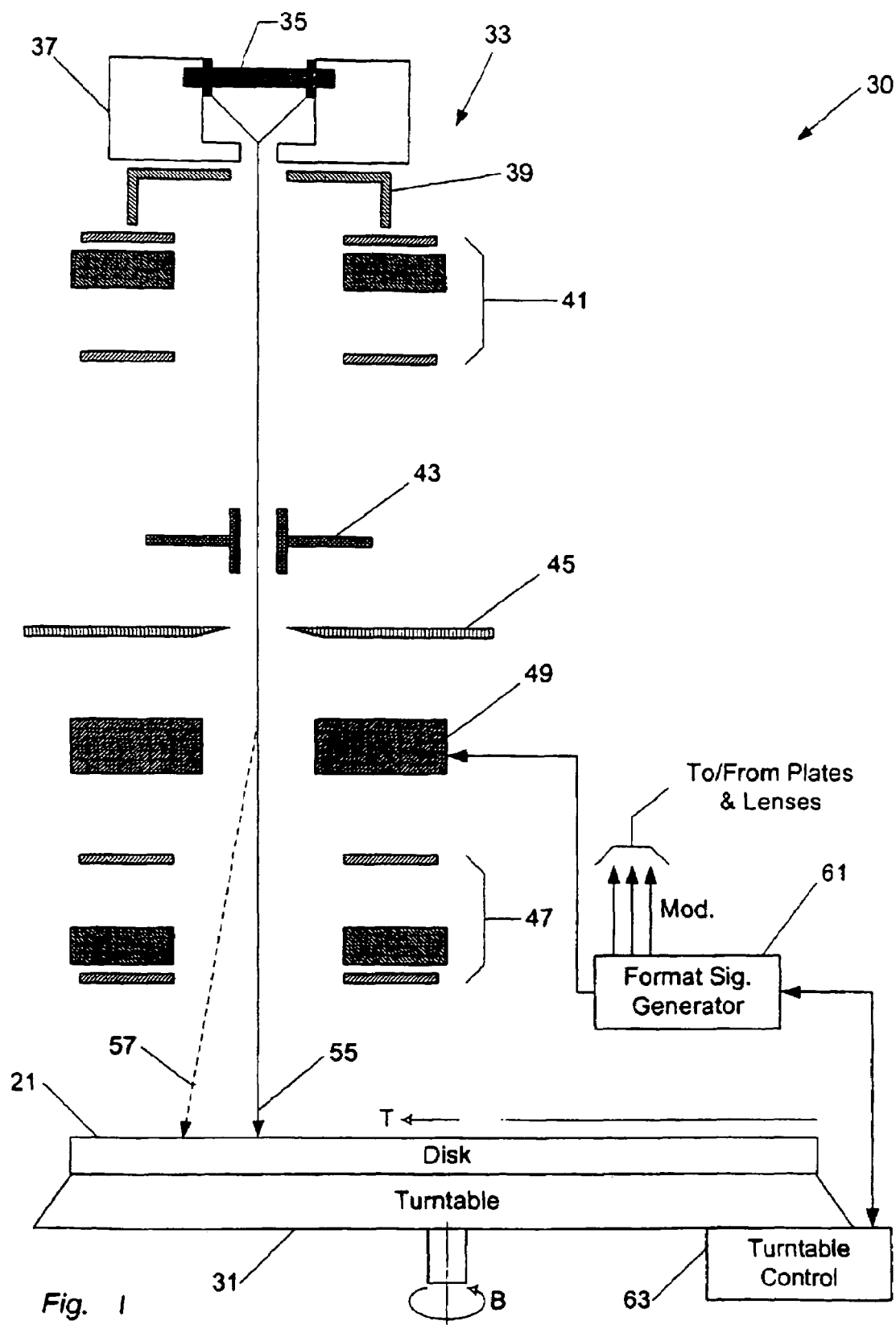
FIG. 1 is a side view of an electron beam type recorder system, for forming servo marks on a disk workpiece, with certain elements of the electron beam device shown in cross-section.
Figure 2:
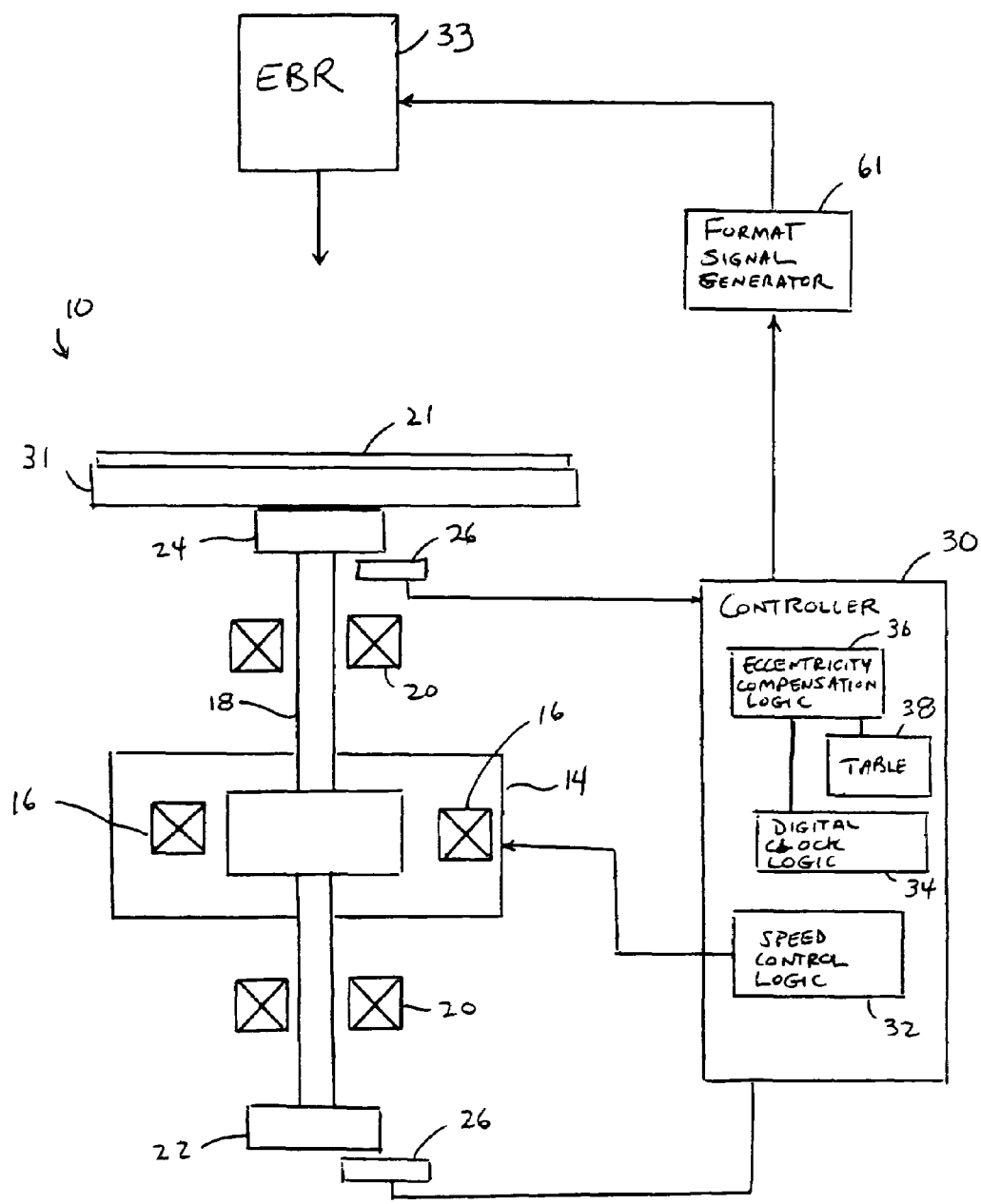
FIG. 2 is a cross-section of a portion of the electron beam recording device of FIG. 1, but showing in more detail the motor, controller and encoder configuration in accordance with embodiments of the present invention.

FIG. 1 depicts a cross-sectional side view of a portion of an electron beam recorder or other rotating recording device in accordance with embodiments of the present invention. Details regarding the dual encoder arrangement are depicted in FIG. 2 and will be discussed later. Marks are formed on the disk surface 21 by the beam recording system 10. The recording system 10 produces a relative motion between the disk workpiece 21 and a recording beam. During this movement, the beam impacts a surface and a system modulates the beam to expose the surface of the disk in a desired pattern. The beam, for example, is modulated to form servo marks in a photoresist surface on the disk 21, according to servo mark patterns.

The system 10 is an electron beam recording system, but may also be another type of recording system, such as a laser beam recording system, for example, which would include different components. The system 10 includes a turntable 31 and an electron beam column 33 for generating and manipulating the recording beam. The turntable 31 supports the disk 21 for rotation in the direction B about its vertical axis. Examples of such an electron beam recording system are available from Unaxis Nimbus Limited. It is assumed that those skilled in the art are generally familiar with the structure and operation of electron beam column devices. However, for completeness of the discussion, a summary description thereof is provided.

In the example, the electron beam column 33 includes a thermal field emission (TFE) electron source 35 and a suppression assembly 37. The column may also include electronic extractor 39. When appropriate voltages are applied to the TFE source 35, the suppression assembly 37 and the extractor 39, these elements cooperate to generate a stream of electrons for further processing in the column 33. The stream of electrons passes through a first triple element lens 41, then through blanking plates 43 and a blanking aperture 45. The stream of electrons then passes through one or more additional lenses, represented, for example, by the second triple lens 47 in the drawing.

The beam position may be controlled by application of a voltage to the deflection plates 49. The precise location of the deflection plates in the column, relative to the other elements of the column, is not critical. In the example, the deflection plates are between the blanking aperture 45 and the lens 41, although other column structures use other arrangements.

The shapes of and voltages of the signals applied to the elements of column 33 serve to focus and shape the stream of electrons into a modulated beam of a desired shape and having a desired energy level for a particular application. For example, a set of signals applied to the elements of the column 33 causes the column to generate a modulated beam for forming servo patterns of particular size and depth at locations on the surface of the disk 21. The drawing in FIG. 1 shows the beam traveling through the column 33 as a straight line, for convenience of illustration. In actual operation, the beam would converge and diverge as it passes through the various elements of the column 33, in order to focus on a sample on the turning table 31 in a desired manner.

The electron beam recording system 30 also includes a format signal generator 61, for generating the various signals used by the electron beam column 33 to modulate and deflect the beam and thus format the patterns being exposed on the disk 21. The formatter 61 essentially comprises circuitry forming one or more signal generators, for producing the various signals applied to the components of the column 30 to produce the desired beam.

One example of a signal produced by the generator 61 is the format modulation signal (or beam "format" signal) for application to the blanking plates 43, which controls the energy level of the electron beam and thus the exposure of the recorded pattern. A controller 30 controls the rotational speed of the turntable 31. The format signal generator 61 provides an encoder signal to the turntable control 63, to regulate the rotational operations of the turntable 31, and the control 63 may provide one or more feedback signals to the generator 61 indicating turntable position and/or speeds. For example, the turntable control 63 may provide an index signal each time a mark or a feature on the turntable or disk passes a reference point. The index signal provides information regarding speed of rotation. For example, the number of index pulses per minute indicates the number of revolutions per minute (RPM). The time between pulses of the index signal represents a period of one rotation. The angle between rotation start point (e.g., 12 o'clock) and the reference point is a known constant. Hence, the index can also be used to determine start and end points of successive rotations.

As discussed earlier, the use of a single encoder centrically mounted at a bottom end of a spindle motor does not provide accurate enough information due to vibrations at the top of the spindle, where the turntable is mounted. This leads to track-to-track phase errors. The use of a dual encoder arrangement, as depicted in the embodiment of FIG. 2, overcomes these disadvantages.

In FIG. 2, the elements of column 33 are depicted as a single block for ease of illustration. The spindle motor 14 has coils 16 and a spindle 18 that rotates on a central axis. The spindle 18 is supported by spindle bearings 20.

A first encoder 22 is positioned at the first end of the spindle 18 (i.e., the bottom end of the spindle 18). A second encoder 24 is located adjacent to the recording surface 31 of the turntable, i.e., at the second end of the spindle 18. Sensors 26 operate in conjunction with the first and second encoders 22, 24 to provide encoder signals to the controller 30.

The controller 30 includes speed control logic 32, digital clock logic 34 and eccentricity compensation logic 36. The speed control logic 32 controls the speed of the spindle motor 14. As will become apparent, the speed control logic 32, during recording, normally controls the speed of the spindle motor 14 based on signals received from the sensor 26 at the first encoder 22.

The digital clock logic provides its output signals to the format signal generator to control the electronic beam recorder column 33 to produce an electron beam in accordance with clock signals. As will be explained further, the digital clock logic 34 employs the eccentricity compensation logic 36 to compensate for the eccentricity of the mounting of the second encoder 24 at the turntable 31. The use of signals derived from the second encoder 24 through the sensor 26 allow for a more precise clock signal to be generated due to the proximity of the second encoder 24 to the recording surface 21, rather than relying on signals related to the first encoder 22. The eccentricity compensation logic 36 employs stored information, such as eccentricity information stored in table 38, to perform the eccentricity compensation.

Figure 4:
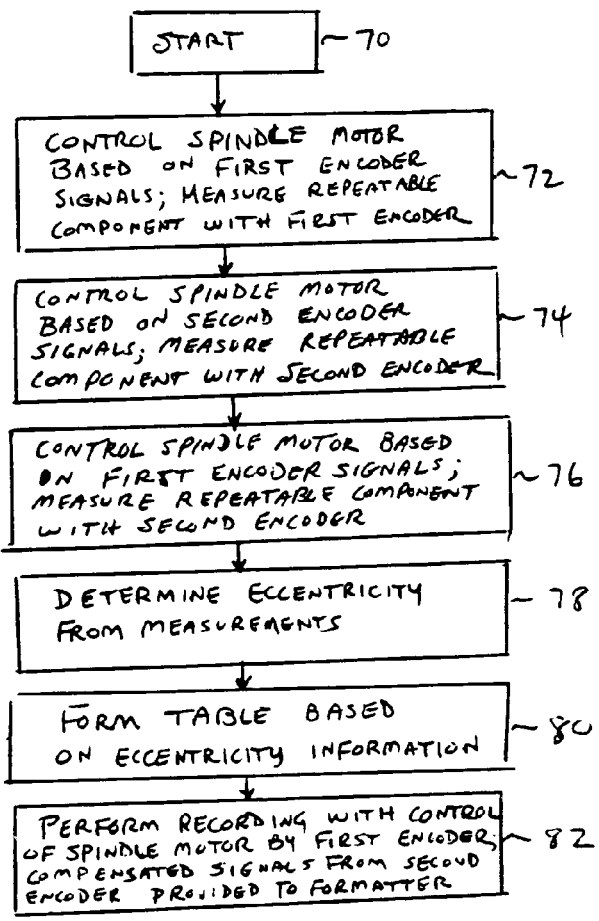
FIG. 4 shows a flow chart of a method of controlling a rotating recording device, such as the electron beam recorder of FIGS. 1-2 in accordance with embodiments of the present invention.

In order to use the second encoder 24 as a position, velocity or clock source for recording the pattern, such as the servo pattern, on the disk substrate 21, the eccentricity of this second encoder 24 must be measured. In certain embodiments of the present invention, the eccentricity of mounting of the second encoder 24 is measured against the more accurately mounted first encoder 22. A process for measuring and compensating for the eccentricity is depicted in FIG. 4 according to certain embodiments of the present invention. In step 70, the process is started. In step 72, control of the spindle motor 18 is made according to the signals related to the first encoder 22. Measurements are made of the repeatable component of the timing of the pulses, using the first encoder 22. All encoders have a tolerance, i.e., how tightly they can control distances between marks laid down on a glass substrate. Once the marks are laid down on the disk, these marks are fixed, but a distance variation, (frequency component when the encoder is rotated), reveals a variation in the timing of the pulses, which is fixed relative to an index position. It is termed a "repeatable component" because the amount of timing variation referenced in the index will always be the same.

In step 74, the second encoder 24 is employed to control the speed of the spindle motor 14 and is also used to measure the repeatable component analogously to the control and measurements performed by the first encoder 22 in step 72.

Next, in step 76, the first encoder 22 is employed to control the spindle motor 14, but the second encoder 24 is used to measure the repeatable component of the timing of the pulses.

In step 78, based upon the above measurements, a measure of eccentricity of the mounting of the second encoder 24 is determined. A table may then be formulated with this eccentricity information, in step 80. The table thus contains stored information related to the eccentricity of the mounting of the second encoder 24, with respect to the central rotation axis of the turntable 31.

In step 82, recording is performed with the relatively accurately mounted first encoder 22 operating as the spindle control encoder for the spindle motor 14, and the digital clock generating system providing signals to the format signal generator 61 during recording. Since the second encoder 24 is located adjacent to the recording surface 21 in the turntable 31, it can provide a more accurate clock signal than the first encoder 22 located a much greater distance away from the recording surface 21 and turntable 31, thereby avoiding the significant mechanical errors and momentary displacements that can occur between the substrate and the encoder. This prevents the pattern being recorded on the substrate from being inaccurate. At the same time, however, the eccentricity of the mounting of the second encoder 24 is compensated using the eccentricity compensation logic 36 and the stored information in the table 38.

Figure 3:
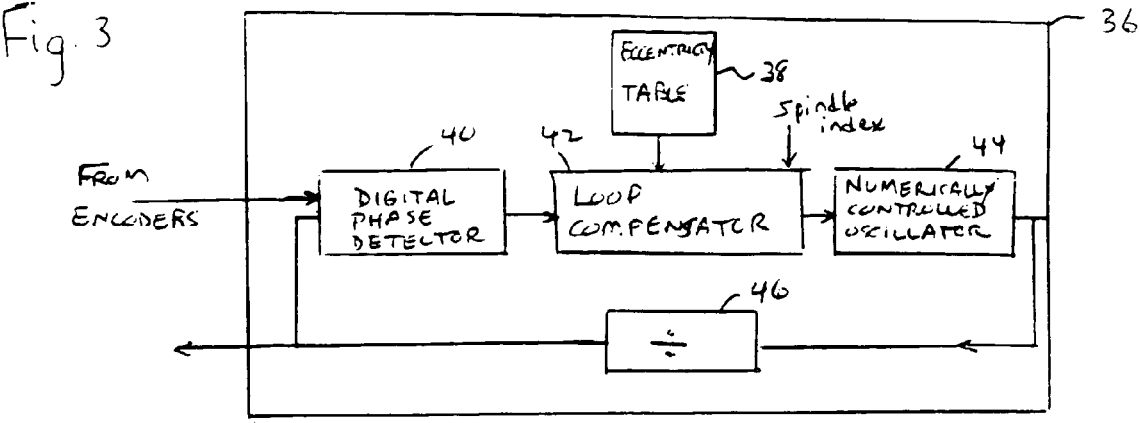
FIG. 3 is a block diagram of eccentricity compensation logic constructed according to an embodiment of the present invention, for use in the electron beam recorder of FIGS. 1 and 2.

The digital clock logic 34 and the eccentricity compensation logic 36 is depicted in block diagram form in FIG. 3. Logic 34 and 36 receive the encoder signals from the first and second encoders 22, 24. During an actual recording operation, the signals from the second encoder 24 are employed to produce the digital clock source, as described above.

The digital clock logic 34 and eccentricity compensation logic 36 include a digital phase detector 40 coupled to a custom filter (loop compensator) 42. A numerically controlled oscillator 44 receives the output of the filter 42 and provides its output to the input of a divide-by-N multiplier 46 that is used to multiply the clock. The digital clock logic 34 and eccentricity compensation logic 36 are able to reference the table 38 to provide the eccentricity compensation as required.

With the embodiments of the present invention, accurate recording of a high quality pattern on a master substrate or other media is achievable in an electron beam recorder or other rotating recording device, by the use of a dual encoder arrangement. The encoder of the spindle control system located some distance away from the recording surface is not employed as the primary clock source for recording the pattern on the master substrate, since the mechanical distance between the spindle encoder and the substrate surface will allow significant mechanical errors and momentary displacements to occur between the substrate and the encoder, causing this pattern recorded on the substrate to be inaccurate. Instead, the invention provides a second encoder located on the turntable adjacent to the recording surface, and which can be used as a position, velocity or clock source for recording the pattern on the substrate. A mounting eccentricity of the second encoder can be compensated by measuring the eccentricity against the spindle control encoder, with a digital clock generating system using a digital phase locked loop compensating for this measured eccentricity.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. An electron beam recorder, comprising: a spindle motor; a spindle driven by the spindle motor, the spindle extending through the spindle motor through the spindle motor and having first and second ends; a turntable mounted at the second end of the spindle and having a central axis of rotation; a first encoder mounted at the first end of the spindle; a second encoder mounted on the turntable; and a controller coupled to the first and second encoders and the spindle motor and controlling the spindle motor and generating recording clock signals as a function of encoder signals received from the first and second encoders.

2. The electron beam recorder of claim 1, wherein the controller includes logic for compensating for eccentric mounting of the second encoder on the turntable with respect to the central axis of rotation of the turntable.

3. The electron beam recorder of claim 2, wherein the controller includes speed control logic for controlling speed of the spindle motor.

4. The electron beam recorder of claim 3, wherein the controller includes digital clock generating logic for generating a digital clock signal.

5. The electron beam recorder of claim 4, further comprising an electron beam generator and a format signal generator coupled to the electron beam generator and modulating the output of the electron beam generator.

6. The electron beam recorder of claim 5, wherein the format signal generator is coupled to receive the digital clock signal as a input and modulates the output of the electron beam generator as a function of the digital clock signal.

7. The electron beam recorder of claim 6, wherein the speed control logic is controlled as a function of encoder signals from only the first encoder.

8. The electron beam recorder of claim 7, wherein the digital clock generating logic generates the digital clock signal as a function of encoder signals from only the second encoder.

9. The electron beam recorder of claim 8, wherein the logic for compensating for eccentric mounting includes stored information regarding a measured eccentricity of the mounting of the second encoder.

10. The electron beam recorder of claim 9, wherein the digital clock generating logic includes a phase locked loop (PLL) coupled to the logic for compensating for eccentric mounting of the second encoder according to the stored information.

11. The electron beam recorder of claim 5, wherein the controller includes position signal generating logic that generates a position signal as a function of encoder signals from only the second encoder, wherein the format signal generator is coupled to receive the position signal as an input and modulates the output of the electron beam generator as a function of the position signal.

12. The electron beam recorder of claim 5, wherein the controller includes velocity signal generating logic that generates a velocity signal as a function of encoder signals from only the second encoder, wherein the format signal generator is coupled to receive the velocity signal as an input and modulates the output of the electron beam generator as a function of the velocity signal.

13. A method of controlling a rotating recording device having a spindle, a first encoder mounted on a first end of the spindle, a turntable mounted on a second end of the spindle, a second encoder mounted on the turntable, and a controller coupled to the first and second encoders and controlling the rotating recording device in accordance with signals from the first and second encoders, the method comprising: determining an eccentricity of the second encoder with respect to a central axis of rotation of the spindle; and compensating for the determined eccentricity in the signals from the second encoder.

14. The method of claim 13, wherein the step of determining includes: controlling rotation of the spindle in accordance with signals from the first encoder, and measuring a repeatable component of a timing signal with the first encoder; controlling rotation of the spindle in accordance with signals from the second encoder, and measuring a repeatable component of a timing signal with the second encoder; and controlling rotation of the spindle in accordance with signals from the first encoder, and measuring a repeatable component of a timing signal with the second encoder.

15. The method of claim 14, wherein the step of determining further includes forming a table based on the measurings, the table containing stored information relating to the determined eccentricity.

16. The method of claim 15, wherein the step of compensating includes passing signals from the second encoder through a phase locked loop and correcting the signals from the second encoder using the stored information in the table.

17. The method of claim 16, wherein during a recording operation the signals from the first encoder control rotation of the spindle and the corrected signals from the second encoder are used as source signals.

18. The method of claim 17, wherein the source signals are at least one of: a position signal source; a velocity signal source; and a clock signal source.

19. The method of claim 18, wherein the rotating recording device is an electron beam recorder.

* * * * *